US011052955B2

(12) United States Patent
Tai et al.

(10) Patent No.: US 11,052,955 B2
(45) Date of Patent: Jul. 6, 2021

(54) SPARE WHEEL CATCHER IN A VEHICLE

(71) Applicant: Ford Global Technologies LLC, Dearborn, MI (US)

(72) Inventors: Gui Hua Tai, Nanjing (CN); Filippo Wang, Nanjing (CN); Dongpeng Kou, Nanjing (CN); David Attard, Essendon (AU)

(73) Assignee: Ford Global Technologies, LLC, Dearborn, MI (US)

(*) Notice: Subject to any disclaimer, the term of this patent is extended or adjusted under 35 U.S.C. 154(b) by 251 days.

(21) Appl. No.: 16/355,022

(22) Filed: Mar. 15, 2019

(65) Prior Publication Data
US 2020/0290689 A1 Sep. 17, 2020

(51) Int. Cl.
B62D 43/04 (2006.01)

(52) U.S. Cl.
CPC .................................... B62D 43/04 (2013.01)

(58) Field of Classification Search
CPC ...... B62D 39/00; B62D 21/15; B62D 21/152; B62D 24/00; B62D 24/02; B62D 25/20; B62D 1/19; B62D 1/197
USPC ..... 296/35.2, 68.1, 187.09, 187.03, 207, 64, 296/76, 77.1, 81, 98; 280/784, 756, 777, 280/124.104, 124.106, 806, 798, 782
See application file for complete search history.

(56) References Cited

U.S. PATENT DOCUMENTS

| 4,848,113 A * | 7/1989 | Parks | B62D 43/007 70/259 |
|---|---|---|---|
| 5,492,194 A * | 2/1996 | McGinn | B60K 17/344 180/233 |
| 8,567,543 B2 * | 10/2013 | Kubota | B60K 6/40 180/68.5 |
| 2005/0285423 A1 | 12/2005 | Song | |
| 2009/0195030 A1 * | 8/2009 | Yamaguchi | B62D 25/087 296/193.08 |
| 2016/0250915 A1 * | 9/2016 | Kobukata | B62D 43/10 180/68.5 |
| 2018/0208255 A1 * | 7/2018 | Farooq | B62D 43/10 |
| 2019/0308575 A1 * | 10/2019 | Kashiwazaki | B60R 19/18 |

FOREIGN PATENT DOCUMENTS

| JP | 2636438 B2 | 7/1997 |
|---|---|---|
| JP | 2009051390 A | 3/2009 |
| JP | 4346928 B2 | 10/2009 |
| JP | 2014083971 A | 5/2014 |

* cited by examiner

Primary Examiner — D Glenn Dayoan
Assistant Examiner — Sunsurraye Westbrook
(74) Attorney, Agent, or Firm — Alice Xu; Kolitch Romano LLP

(57) ABSTRACT

A spare wheel catcher in a vehicle comprises a base adapted to be connected on a rear differential and a catcher plate. The base includes a support extending along a longitudinal direction of the vehicle at an assembled position and a connection member; and the catcher plate is connected with a first end of the support and forms an obtuse angle with a forward moving direction of the vehicle.

18 Claims, 9 Drawing Sheets

SPARE WHEEL CATCHER IN A VEHICLE

FIELD

The present disclosure relates to a spare wheel catcher in a vehicle.

BACKGROUND

In some vehicles, a spare wheel is mounted underneath a rear frame of the vehicle. During a rear impact, the spare wheel may be released from its mounts and move forward at a longitudinal direction and may contact a fuel system. JP2636438 discloses a differential mount member for a rear differential to restrict forward movement of a spare wheel and retain the spare wheel during a rear collision. The differential mount member is attached to the rear differential and further attached to the suspension member attached to the vehicle body. US20050285423 discloses a stopper to convert the forward motion of the spare tire and prevent the spare tire from directly impacting a fuel tank during a vehicle collision. The stopper includes a forward motion blocking arm protruding out from the pivot axis toward the front of the spare tire and a direction conversion arm 11 protruding from the pivot axis between the upper portion of the spare tire and a lower portion of the vehicle body. The stopper is fixed at a lower portion of a vehicle body via a pivot axis. However, the inventors of the present disclosure have recognized that there is a need for a simple device that provides flexibility for packaging in a vehicle while limiting a travel of the spare wheel during a rear impact.

SUMMARY

According to one aspect of the present disclosure, the spare wheel catcher in a vehicle is provided. The spare wheel catcher includes a base adapted to be connected on a rear differential and a catcher plate. The base includes a support extending along a longitudinal direction of the vehicle at an assembled position and a connection member. The catcher plate is connected with a first end of the support and forms an obtuse angle with a forward moving direction of the vehicle.

In one embodiment, the first end of the support may be connected to the catcher plate along a central line of the catch plate.

In another embodiment, the connection member of the base may be a flat plate and include a plurality of assemble holes, and the support may protrude from an upper surface of the connection member.

In another embodiment, a main surface of the support may be substantially perpendicular to the upper surface of the connection member.

In another embodiment, a main surface of the support may be substantially perpendicular to a vehicle floor at the assembled position, and the connection member may include a first wing and a second wing extending from the main surface of the support at opposite directions. The first wing, the second wing and a second end of the support may be adapted to be connected to the rear differential.

In another embodiment, the base and the catcher plate may be integrally formed.

According to another aspect, a spare wheel catcher assembly in a vehicle is provided. The spare wheel catcher assembly comprises a rear differential to be connected with a rear axle of the vehicle; and a spare wheel catcher. The spare wheel catcher includes a base connected to the rear differential, and a catcher plate connected with the base. The catcher plate forms an obtuse angle with a forward moving direction of the vehicle and a main surface of the catcher plate faces a rear of the vehicle. When the spare wheel moves forward during a rear impact, the spare wheel catcher contacts a spare wheel mounted in the vehicle to cause the spare wheel to rotate around a transverse axis of the vehicle along with the spare wheel catcher and the rear differential such that a speed of a spare wheel movement is reduced.

In one embodiment, the base may include a support extending along a longitudinal direction of the vehicle and a connection member. The support may have a first end and a second end closer to a front of the vehicle than the first end, and the catcher plate is connected with the first end of the support.

In another embodiment, the first end of the support may be connected to the catcher plate along a central line of the catcher plate.

In another embodiment, the connection member of the base may be a flat plate, and the support may protrude from an upper surface of the connection member.

In another embodiment, a main surface of the support may be substantially perpendicular to the upper surface of the connection member and the connection member may include a plurality of holes. A housing of the rear differential may include a plurality of bosses on a top and each boss has a recess. The connection member may be connected to the top of the housing via a plurality of bolts passing through the plurality of holes of the connection member and the plurality of recesses of the bosses.

In another embodiment, the connection member may include a first wing and a second wing extending from a main surface of the support at opposite directions. The first wing, the second wing and the second end of the support may be connected to a flange of a housing of the rear differential and a second end of the support may be connected to a top of the housing of the rear differential.

In another embodiment, the base and the catcher plate may be integrally formed.

In another embodiment, the main surface of the catcher plate may be parallel to a plane passing through a central axis of the rear axle or may be in a plane passing through a central axis of the rear axle.

According to another aspect, a vehicle is provided. The vehicle comprises a rear differential connected with a rear axle; a spare wheel mounted underneath a rear frame of the vehicle and disposed behind the rear differential; a fuel tank disposed in front of the rear axle; and a spare wheel catcher. The spare wheel catcher includes a base connected to the rear differential, and a catcher plate connected with the base. A main surface of the catcher plate forms an obtuse angle with a forward moving direction of the vehicle, faces a rear of the vehicle, and at least partially overlaps with a front side of the spare wheel at a height direction. The front side of the spare wheel at least partially overlaps with a rear surface of the fuel tank, and. The spare wheel catcher contacts the spare wheel when the spare wheel moves forward during a rear impact, and a longitudinal movement of a spare wheel is transferred into a rotation around an axis at a transverse direction of the vehicle when the catcher plate is lowered with the rear differential and rotates around a rear axle by an impact force.

In one embodiment, the spare wheel may be disposed to have an angle to a vehicle floor.

In one embodiment, the main surface of the catcher plate may be positioned in a plane passing through a central axis of the rear axle and the plane may have the obtuse angle to the forward moving direction of the vehicle.

In another embodiment, the spare wheel catcher may be disposed on a top of a housing of the rear differential, and a central line of the spare wheel catcher is adjacent and parallel to a central line of the spare wheel at a longitudinal direction.

In another embodiment, the base may include a support extending a longitudinal direction of the vehicle and a connection member connected to a housing of the rear differential. The support may have a first end and a second end closer to a front of the vehicle than the first end, and the catcher plate may be connected with the first end of the support.

In another embodiment, a main surface of the support may be substantially perpendicular to the upper surface of the connection member and the connection member may include a plurality of holes. A housing of the rear differential may include a plurality of bosses on a top and each boss may have a recess, and the connection member may be connected to the top of the housing via a plurality of bolts passing through the plurality of holes of the connection member and the plurality of recesses of the bosses.

In another embodiment, the connection member may include a first wing and a second wing extending from a main surface of the support at opposite directions. The first wing, the second wing and the second end of the support may be connected to a flange of a housing of the rear differential and a second end of the support may be connected to a top the housing of the rear differential.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed spare wheel catchers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various spare wheel catchers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
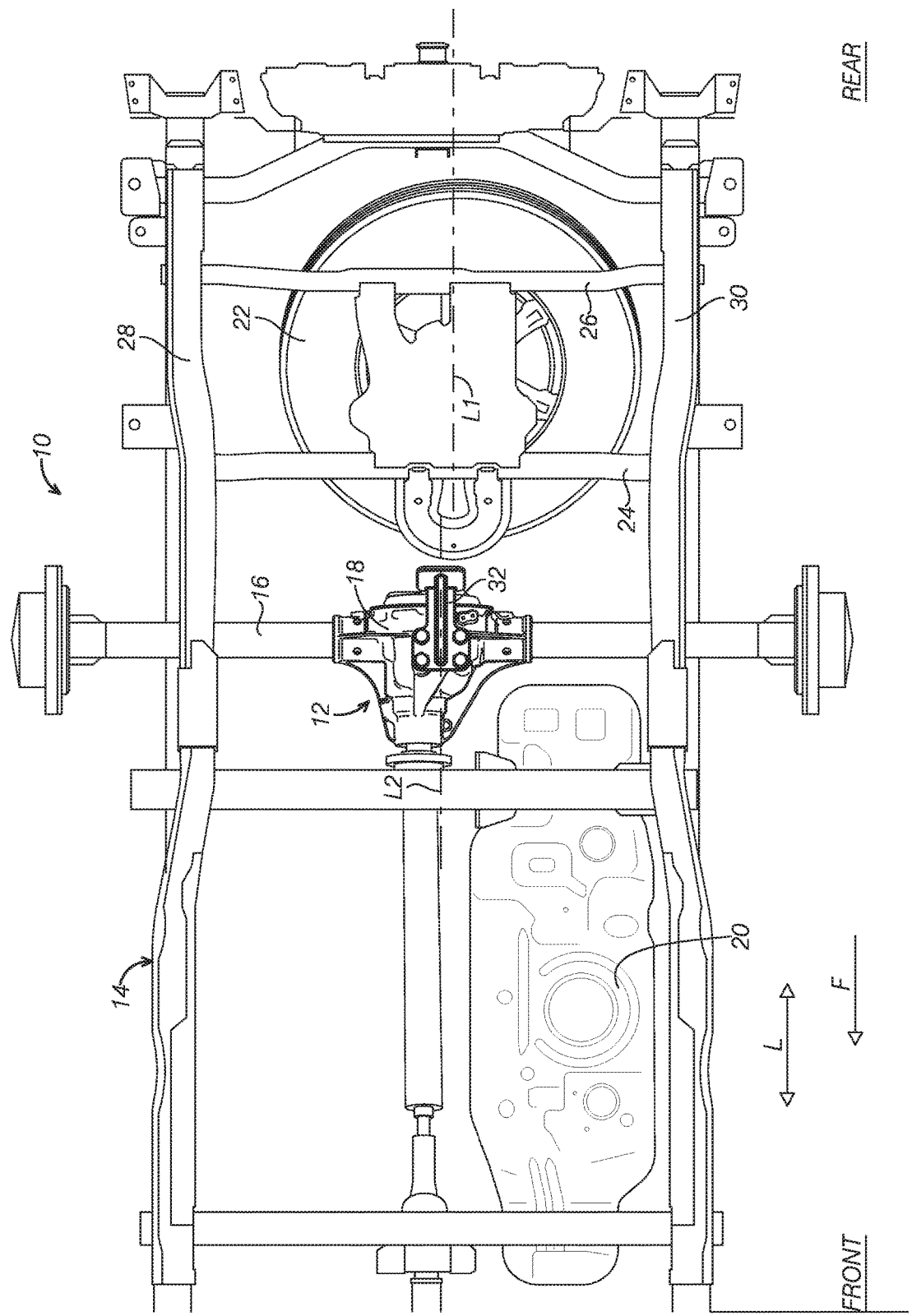
FIG. 1 is a partial view of a vehicle, illustrating a spare wheel catcher assembly mounted on a vehicle body frame according to one embodiment of the present disclosure.
Figure 2:
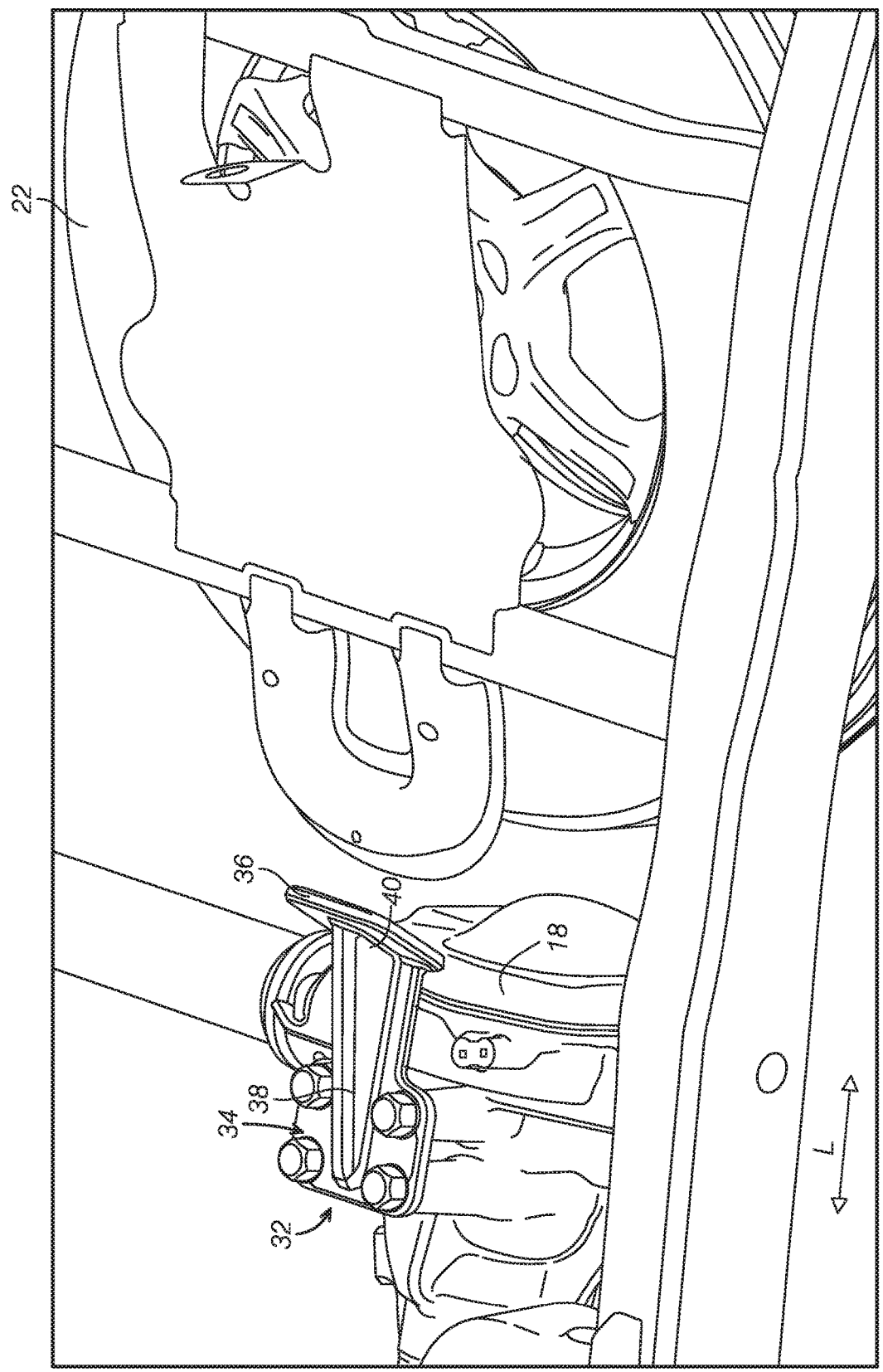
FIG. 2 is an enlarged perspective view of the vehicle body frame in FIG. 2.

Referring to FIGS. 1-2, FIG. 1 is a partial plan view of a vehicle 10, illustrating a spare wheel catcher assembly 12 mounted on a Vehicle body frame 14 according to one embodiment of the present disclosure. FIG. 2 is an enlarged perspective view of the vehicle body frame in FIG. 1. The vehicle 10 comprises the vehicle body frame 14, a rear axle 16 connected to the vehicle body frame 14, a rear differential 18 mounted on the rear axle 16 and a fuel tank 20. The fuel tank 20 is disposed in the front of the real axle 16. A spare wheel 22 is mounted underneath the vehicle body frame 14 and disposed behind the rear axle 16 and rear differential 18. In other words, the fuel tank 20 is closer to a front of the vehicle than the rear axle 16, and the rear axle 16 is positioned between the fuel tank 20 and the spare wheel 22. In some embodiments, the spare wheel 22 may be mounted to transverse bars 24, 26. The transverse bars 24, 26 are spaced apart and connected to longitudinal bars 28, 30. In some embodiments, the spare wheel 22 may be mounted to the transverse bars 24, 26 by a cable (not shown). In some embodiments, the spare wheel 22 may be mounted to the transverse bars 24, 26 by bolt connection. FIGS. 1-2 show the vehicle body frame 14 of a truck. It should be appreciated that the spare wheel catcher assembly 12 may be implemented in any vehicles with a spare wheel mounted behind a fuel system and a rear differential.

The spare wheel catcher assembly 12 may include the rear differential 18 and a spare wheel catcher 32 mounted on the rear differential 18. Referring to FIG. 1, in some embodiments, a central line L1 of the spare wheel 22 at a longitudinal direction L may be substantially aligned with a central line L2 of the spare wheel catcher 32 at the longitudinal direction L (i.e., a diameter of the spare wheel 22 at the longitudinal direction L). In some embodiments, the central line L2 of the spare wheel catcher 32 at a longitudinal direction L may be adjacent and parallel to the central line L1 of the spare wheel 22 at the longitudinal direction L.

Figure 3:
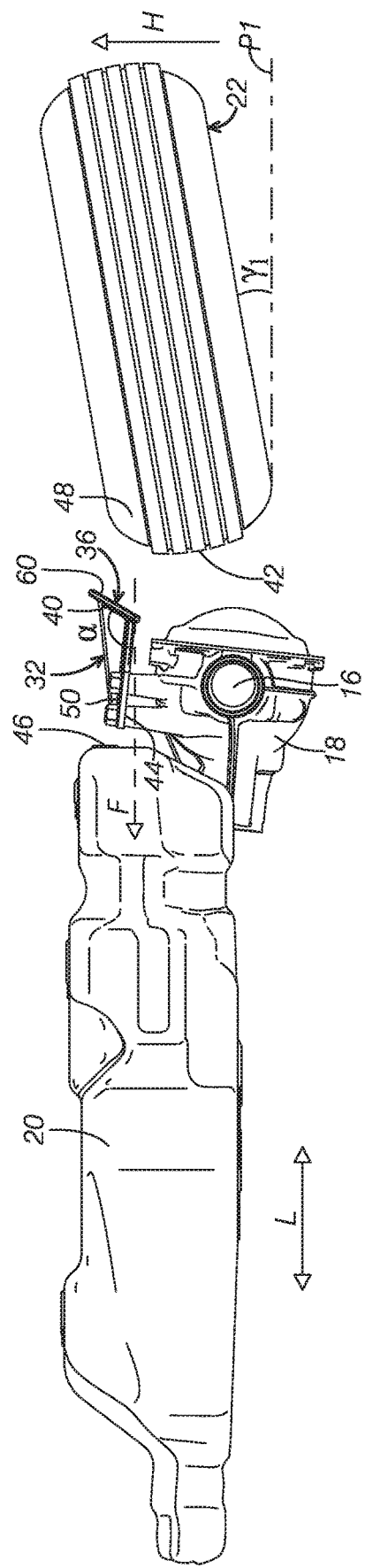
FIG. 3 is a partial side view a fuel tank, a rear differential, a spare wheel catcher and a spare wheel, illustrate the relative positions of the fuel tank, the rear differential, the spare wheel catcher and the spare wheel at a normal position.

Referring to FIG. 3, FIG. 3 illustrates the relative positions of the fuel tank 20, the rear differential 18, the spare wheel catcher 32 and the spare wheel 22 at a normal position. For the sake of clarity, only fuel tank 20, the rear differential 18, the spare wheel catcher 32 and a spare wheel 22 are shown in FIG. 3. In the depicted embodiment, the spare wheel 22 is disposed to have an angle γ1 with a plane P1 substantially parallel to a vehicle floor or have an angle γ1 with the vehicle floor. In some embodiments, the angle γ1 is greater than zero and in an acute angle. With further reference to FIG. 2, the spare wheel catcher 32 may include a base 34 connected to the rear differential 18 and a catcher plate 36, in some embodiments, the base 34 may be adapted for connecting with the rear differential 18 and include a support 38 extending along the longitudinal direction L of the vehicle 10. The catcher plate 36 is connected to a first end 40 of the support and forms an angle α angle with a forwarding direction F of the vehicle 10. The angle α is obtuse or greater than 90 degrees. The center line L2 of the spare wheel catcher 32 may the center line of the catcher plate 36.

As shown in FIG. 3, a main surface 60 the catcher plate 36 faces the spare wheel 22 and at least partially overlaps with a front side 42 of the spare wheel 22 along the height direction H. In some embodiments, the catcher 32 may be disposed on a top 44 of the rear differential 18. The catcher plate 36 at least partially overlaps with an upper portion 48 of the spare wheel 22. Further, a rear side 46 of the fuel tank 22 at least partially overlaps with the spare wheel 22 along the height direction H.

Figure 4:
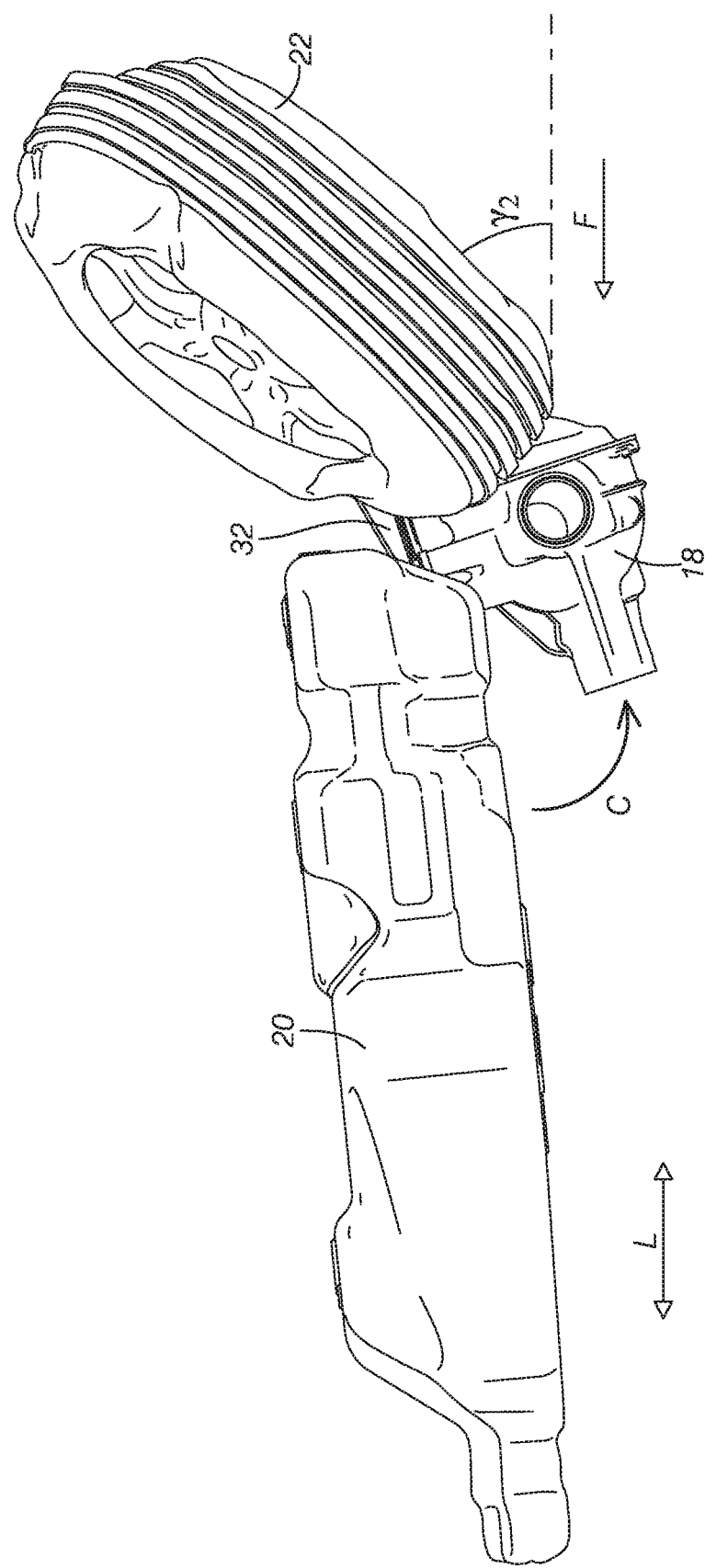
FIG. 4 is a partial side view a fuel tank, a rear differential, a spare wheel catcher and a spare wheel, illustrate the relative positions of the fuel tank, the rear differential, the spare wheel catcher and the spare wheel after a rear impact.

Referring to FIG. 4, FIG. 4 illustrates the relative positions of the fuel tank 20, the rear differential 18, the spare wheel catcher 32 and the spare wheel 22 after a rear impact. For the sake of clarity, only fuel tank 20, the rear differential 18, the spare wheel catcher 32 and the spare wheel 22 are shown in FIG. 4. During the rear impact, the spare wheel 22 moves forward at a longitudinal direction L or the vehicle forwarding direction F. With further reference to FIG. 3, the spare wheel 22 is positioned to have an angle γ1 relative to the vehicle floor and the front side 42 of the spare wheel 22 is oriented toward the rear differential 18 at the normal position. The tilted catcher plate 36 guides the spare wheel 22 to contact the rear differential 18 with a thrust force downward. As such, the spare wheel 22 hits the catcher plate 36 and the rear differential 18 at an impact force with an angle relative to the vehicle forwarding direction F. The impact force rotates the rear differential 18 around the rear axle 16 at a counterclockwise direction C while the spare wheel 22 is rotated at the counterclockwise direction C as well. That is, the spare wheel 22 is rotated around a transverse axis of the vehicle substantially parallel to the rear axle 16 or the spare wheel 22 is rotated around the spare wheel catcher 32. As a result, the spare wheel 22 is raised up to the position due to the rotation and has an angle γ2 to the vehicle floor as shown in FIG. 4. The angle γ2 after the rotation is greater than the angle γ1 when the spare wheel 22 is at the normal position. In some embodiments, the rear differential 18 after the rear impact may be lowered compared to the normal position. With the spare wheel catcher 32 located on a travel path of the spare wheel 22, the travel of the spare wheel 22 can be significantly limited during the rear impact. Further, the longitudinal movement of the spare wheel 22 can be transferred into the rotation around the spare wheel catcher 32, which reduces the kinetic energy of the speeding spare wheel 22. In this way, the hard contact between the spare wheel 22 and the fuel tank 20 can be relieved and the potential damage to the fuel tank can be prevented or reduced.

Figure 5:
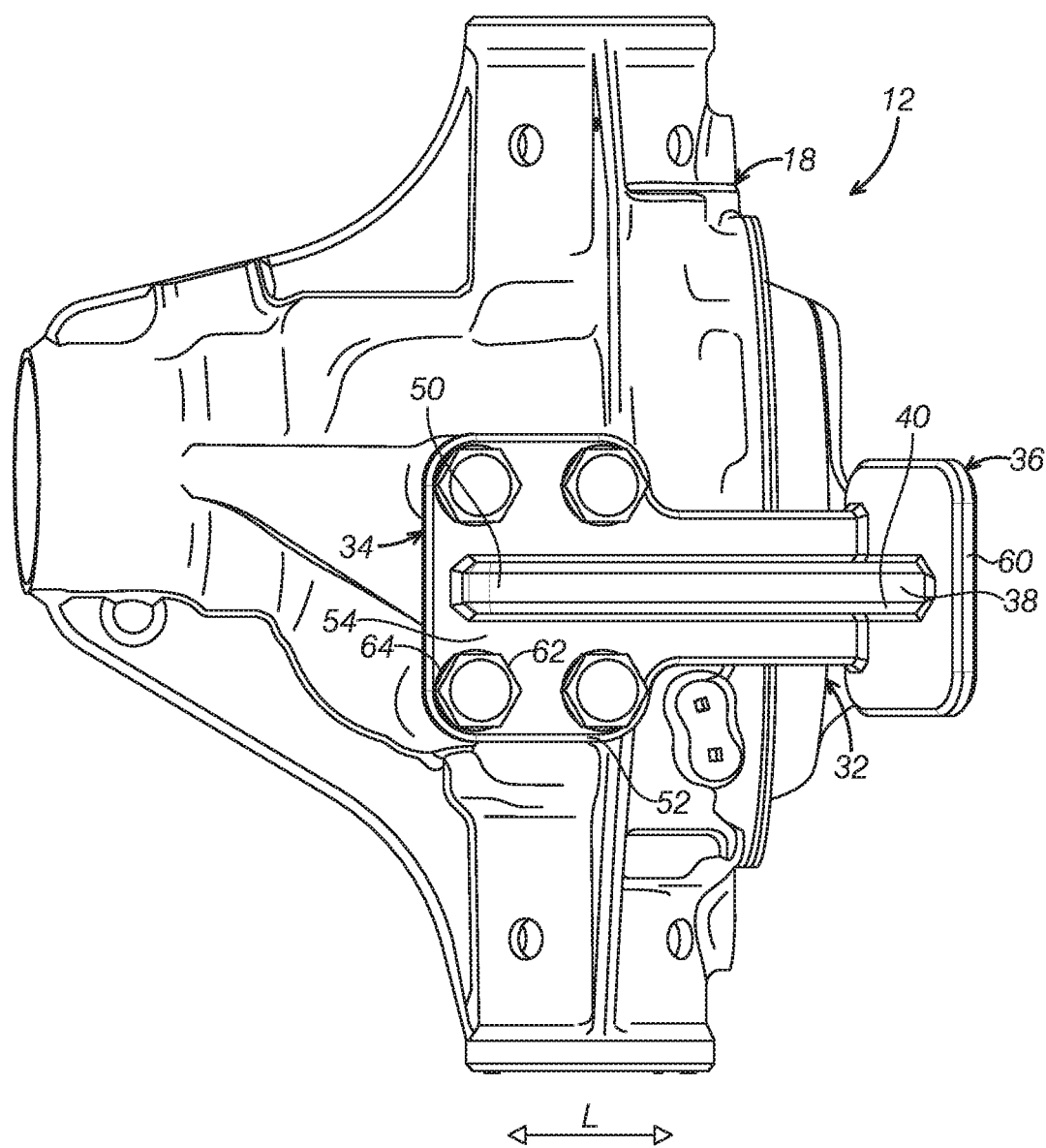
FIG. 5 shows a top view of the spare wheel catcher assembly in FIG. 1.
Figure 6:
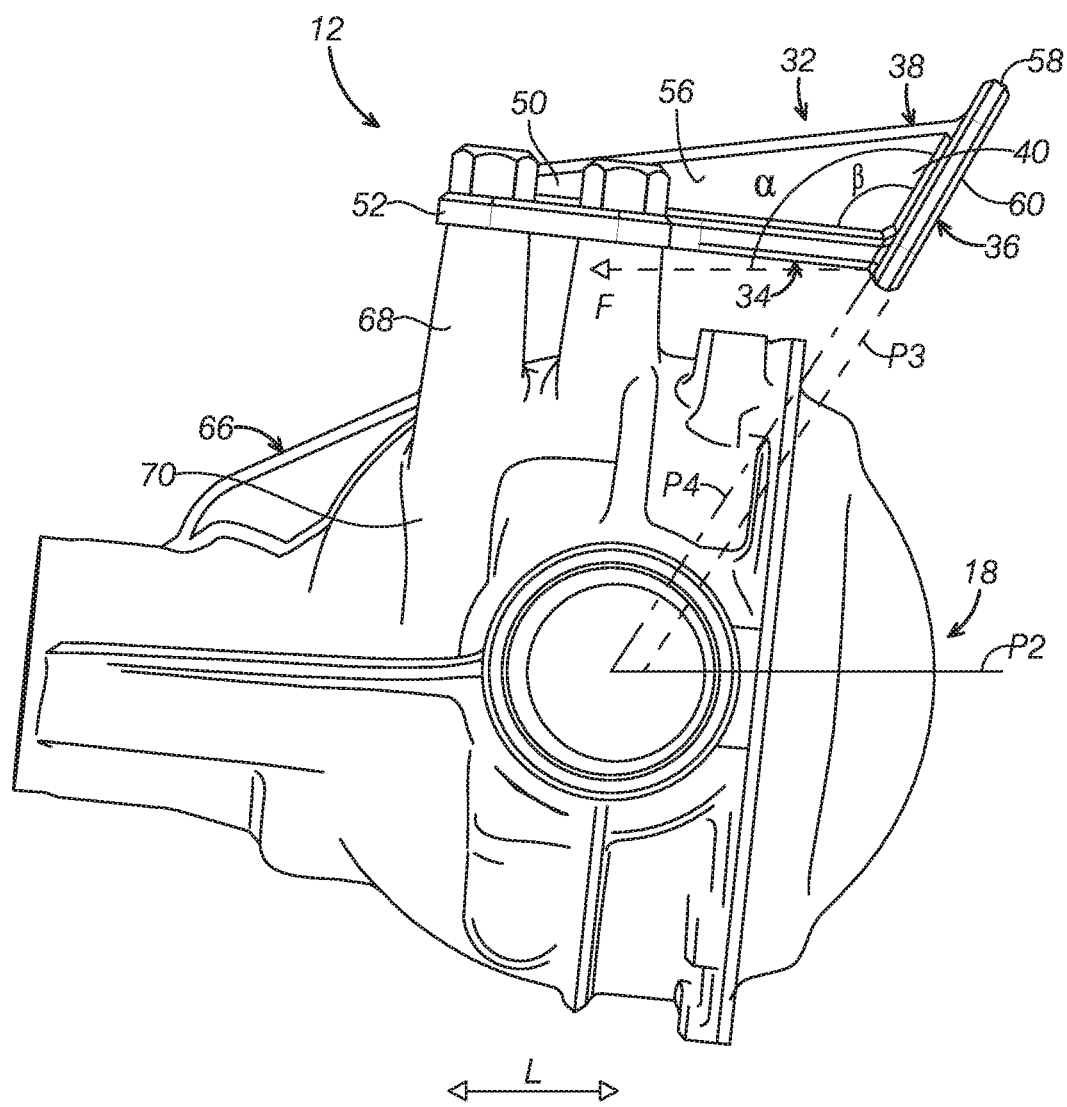
FIG. 6 shows a side view of the spare wheel catcher assembly in FIG. 5.
Figure 7:
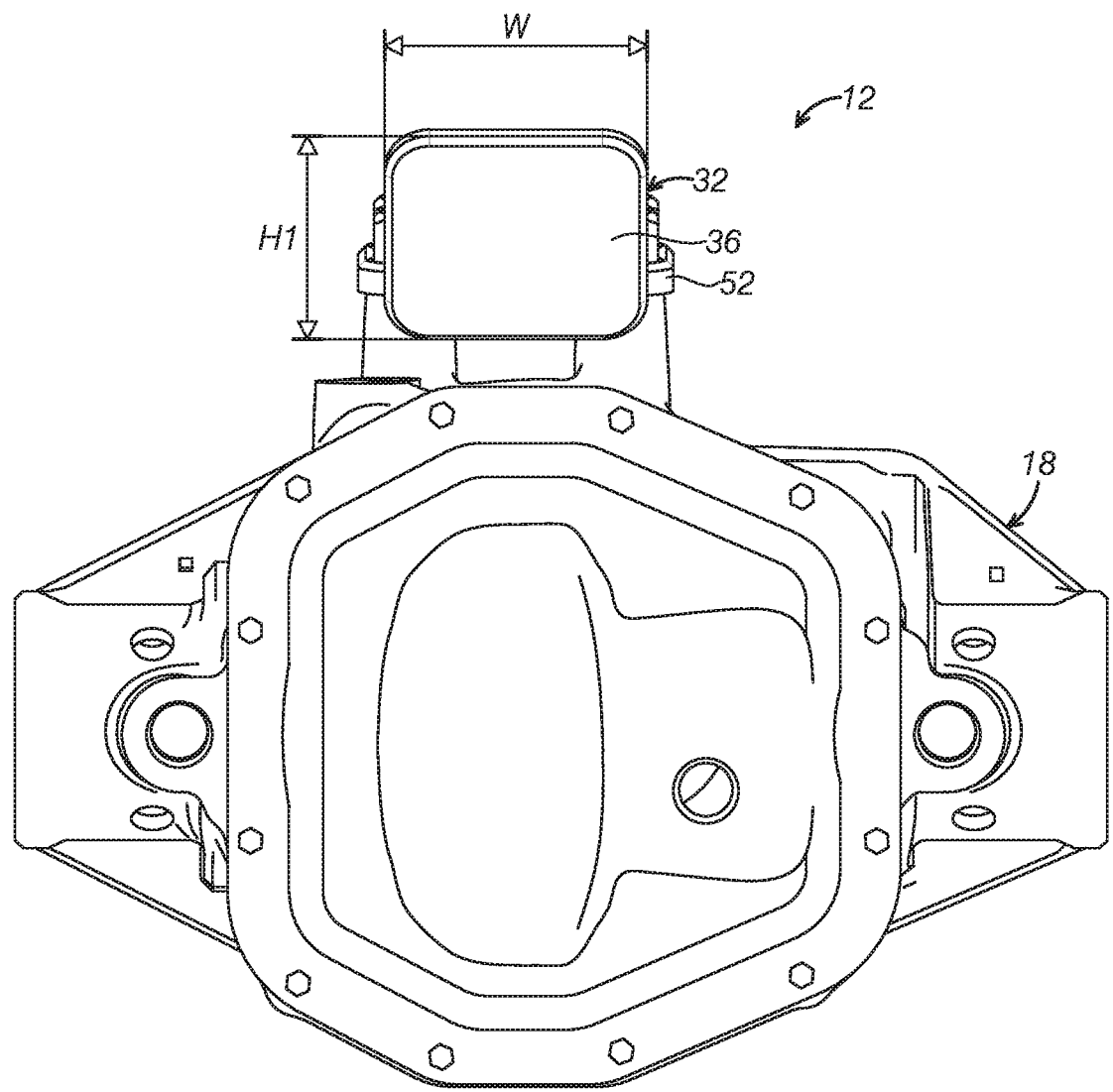
FIG. 7 shows a rear view of the spare wheel catcher assembly in FIG. 5.
Figure 8:
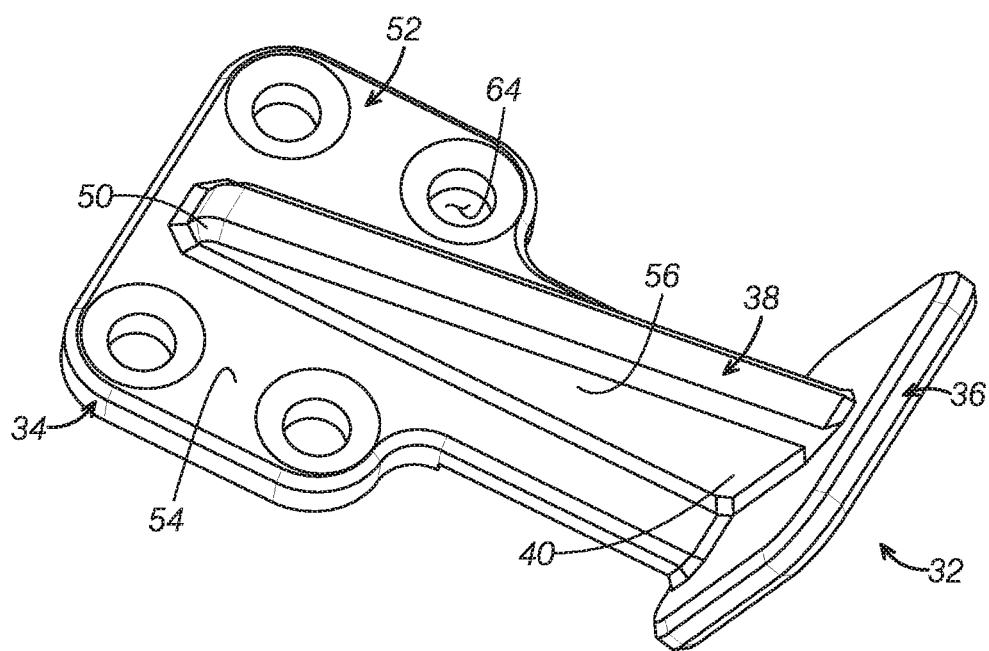
FIG. 8 shows a perspective view of a spare wheel catcher in FIG. 5.

Referring to FIGS. 5-8, FIG. 5 shows a top view of the spare wheel catcher assembly 12 in FIG. 1, FIG. 6 shows a rear view of the spare wheel catcher assembly 12 in FIG. 5, FIG. 7 shows a top view of the spare wheel catcher assembly 12 in FIG. 5, and FIG. 8 shows a perspective view of the spare wheel catcher 32 in FIG. 5. The spare wheel catcher 32 may include a base 34 adapted to be connected on a rear differential 18 and a catcher plate 36. In some embodiments, the base 34 includes a support 38 extending the longitudinal direction L of the vehicle 10. The support 38 has a first end 40 and a second end 50. With further reference to FIG. 3, the first end 40 is adjacent to the spare wheel 20. In other words, the second end 50 is closer to a front of the vehicle than the first end 40. In some embodiments, the support 38 may be a flat plate with a certain thickness. In the depicted embodiment, the support 38 has a triangle shape. It should be appreciated that the support 38 may have any appropriate shapes such as a rectangular shape. The catcher plate 36 is connected to the first end 40 of the support and forms an angle α angle with a forwarding direction F of the vehicle 10. The support 38 disposed along the longitudinal direction L provides reinforcement to the catcher plate 36 against the longitudinal force during the rear impact.

In some embodiments, the base 34 of spare wheel catcher 22 may include a connection member 52. In the depicted embodiment, the connection member 52 is a flat plate. The support 38 protrudes from an upper surface 54 of the connection member 52 and a main surface 56 of the support 38 is substantial perpendicular to the upper surface 54 of the connection member 52.

Referring to FIG. 6, in some embodiments, the catcher plate 36 forms an angle β with the connection member 52. An upper side 58 of the catcher plate 36 extends away from the connection member 52 and the angle β is obtuse. In some embodiments, the connection member 52 is parallel to a vehicle floor or a vehicle forwarding direction F at an assembled position and the angle β is the same as the angle α. In the depicted embodiment, the connection member 52 is not parallel to a vehicle floor or a vehicle forwarding direction F at the assembled position and the angle β is less than the angle α as shown in FIG. 6. In same embodiments, a projection of an upper side 58 of the catcher plate 36 on a plane P2 is spaced away from the rear differential 18. The plane P2 is substantially parallel to the vehicle floor. That is, the catcher plate 36 forms an obtuse angle with the connection member 52.

Referring to FIG. 6, in some embodiments, the angle β is configured such that a plane P3 passing a main surface 60 of the catcher plate 36 is substantially parallel to a plane P4 passing a center C of the rear axle 16. The catch plate 36 positioned at such angle can provide desired contact with the spare wheel 22 when the spare wheel 36 is moved close to the catch plate 36. During the contact, two components of a force will be generated. A horizontal component of the force stops the spare wheel 22 from moving forward and a vertical component of the force pushes the spare wheel 22 down and cause rotation around the axis at the transverse direction of the vehicle. It should be appreciated that the plane P3 may have a small angle to the plane P4. For example, the angle between planes P3 and P4 may be in a range of about 5-20 degree.

The catcher plate 36 may be sized to provide a sufficient contact area with the spare wheel 22 during the rear impact while meeting the packaging requirement and saving the material. In some embodiments, a width W of the catcher plate 36 may be in a range of about 80 to 120 mm and a height H1 of the catcher plate 36 may be about 60 to 100 mm. In some embodiments, the width W of the catcher plate 36 may be about 100 mm and the height H1 of the catcher plate 36 may be about 80 mm.

In some embodiments, the spare wheel catcher 32 may be made from metal such as steel. The base 34 and the catcher plate 36 may be integrally formed in a casting process.

In some embodiments, the spare wheel catcher 32 may be connected to the rear differential 18 via bolt connection. The spare wheel catcher assembly 12 may further include a plurality of bolts 62. The connection member 52 may include a plurality of holes 64 to receive the bolts 62. A housing 66 of the rear differential 18 may include a plurality of bosses 68 protruding from a main body 70. Each boss 68 includes a recess (not shown) configured to receive the bolts 62. In some embodiments, the bolts 62 may be thread bolts and the recesses may be threaded holes matching the thread of the bolt 62. In some embodiments, the housing 66 of the rear differential 18 may comprise metal and the housing 66 is made in a casting process.

It should be appreciated that the spare wheel catcher 32 may be connected to the rear differential 18 with any appropriate approaches. For example, the spare wheel catcher 32 may be connected to the rear differential 18 by welding.

Figure 9:
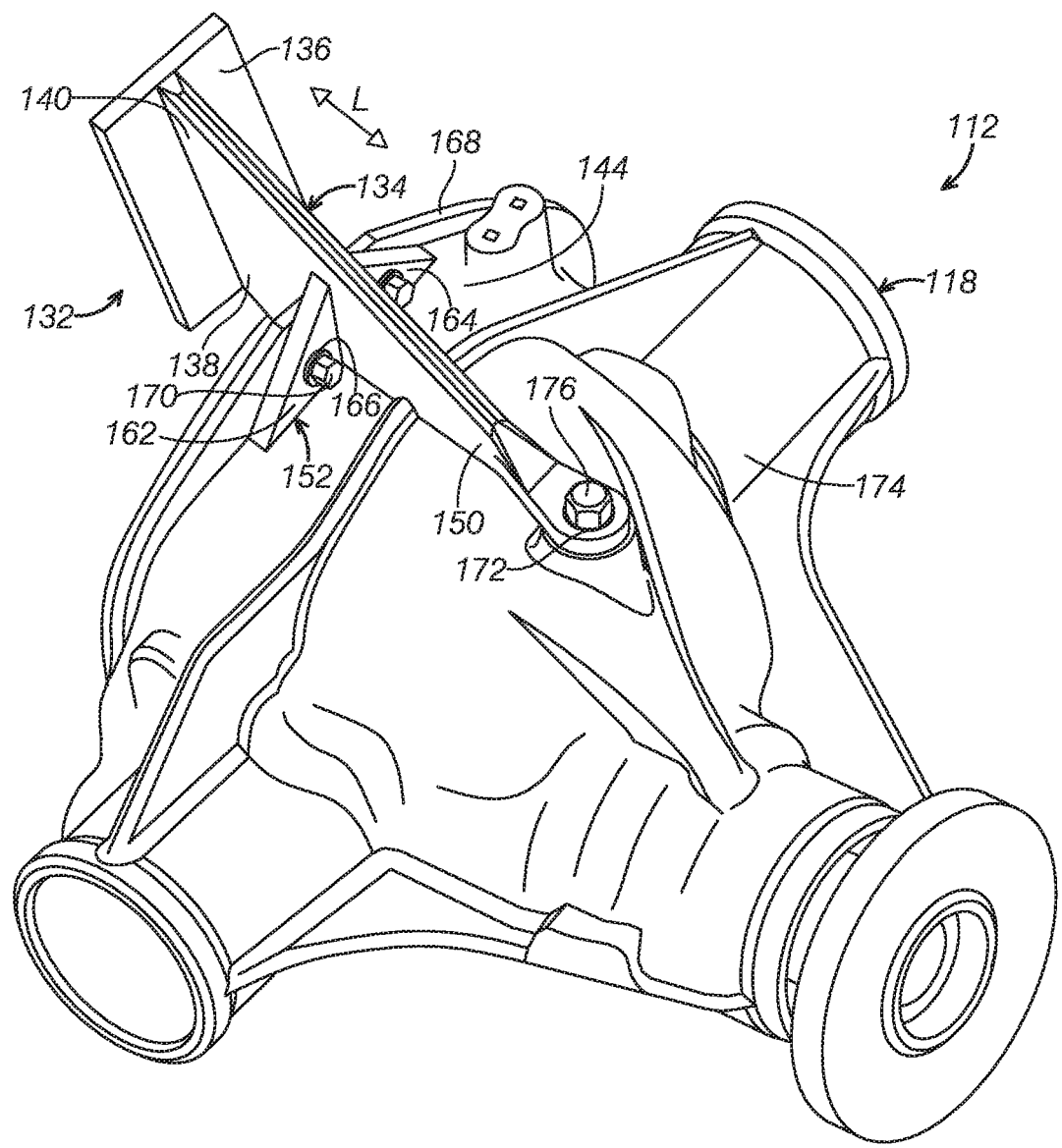
FIG. 9 shows a spare wheel catcher assembly according to another embodiment of the present disclosure.

FIG. 9 shows a spare wheel catcher assembly 112 according to another embodiment of the present disclosure. For the sake of brevity, in this example, the elements and features similar to those previously shown and described will not be described in much further detail. In other words, differences between the present embodiment and the embodiment of FIGS. 1-8 will be mainly described. The spare wheel catcher assembly 112 includes a rear differential 118 and a spare wheel catcher 132 connected to the rear differential 118. In the depicted embodiment, the spare wheel catcher 132 is mounted on a top 144 of the rear differential 118. The spare wheel catcher 132 may include a base 134 connected on the rear differential 118 and a catcher plate 136. In some embodiments, the base 134 includes a support 138 extending in the longitudinal direction L of the vehicle 10. The support 138 has a first end 140 and a second end 150. The first end 140 is connected to the catcher plate 136. The base 134 may further include a connection member 152. In the depicted embodiment, the connection member 152 includes a first wing 162 and a second wing 164. The first wing 162 and the second wing 164 extend from the support 138 at opposite sides. In some embodiments, each of the first wing 162 and the second wing 164 has a first connection hole 166.

In some embodiments, a flange 168 of the rear differential 118 may include two second connection holes (not shown) corresponding to the first connection holes 166. The spare wheel assembly 112 further includes a plurality bolts 170 to pass through the first connection holes 166 and the second connection holes to connect the spare wheel catcher 132 to the rear differential 118. In some embodiments, the second end 150 of the support 138 may include a third connection hole 172. A housing 174 of the rear differential 118 may include a fourth connection hole (not shown). The second end 150 of the support 138 is connected to the housing 174 via a bolt 176.

It should be appreciated that the spare wheel catcher 132 may be connected to the rear differential 118 by any appropriated approaches such as welding.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to an element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A spare wheel catcher in a vehicle, comprising:
   a base adapted to be connected on a rear differential, wherein the base includes a support extending along a longitudinal direction of the vehicle at an assembled position and a connection member; and
   a catcher plate connected with a first end of the support, wherein the catcher plate forms an obtuse angle with a forward moving direction of the vehicle,
   wherein the base and the catcher plate are integrally formed.

2. The spare wheel catcher of claim 1, wherein the first end of the support is connected to the catcher plate along a central line of the catch plate.

3. The spare wheel catcher of claim 1, wherein the connection member of the base is a flat plate and includes a plurality of assemble holes, and the support protrudes from an upper surface of the connection member.

4. The spare wheel catcher of claim 3, wherein a main surface of the support is substantially perpendicular to the upper surface of the connection member.

5. The spare wheel catcher of claim 1, wherein a main surface of the support is substantially perpendicular to a vehicle floor at the assembled position, and the connection member includes a first wing and a second wing extending from the main surface of the support at opposite directions, and wherein the first wing, the second wing and a second end of the support are adapted to be connected to the rear differential.

6. A spare wheel catcher assembly in a vehicle, comprising:
   a rear differential to be connected with a rear axle of the vehicle; and a spare wheel catcher including:
   a base connected to the rear differential, and
   a catcher plate connected with the base, wherein the catcher plate forms an obtuse angle with a forward moving direction of the vehicle and a main surface of the catcher plate faces a rear of the vehicle; and
   wherein, when a spare wheel mounted in the vehicle moves forward during a rear impact, the spare wheel catcher contacts the spare wheel to cause the spare wheel to rotate around a transverse axis of the vehicle along with the spare wheel catcher and the rear differential such that a speed of a spare wheel movement is reduced, wherein the base and the catcher plate are integrally formed.

7. The spare wheel catcher assembly of claim 6, wherein the base includes a support extending along a longitudinal direction of the vehicle and a connection member and wherein the support has a first end and a second end closer to a front of the vehicle than the first end, and the catcher plate is connected with the first end of the support.

8. The spare wheel catcher assembly of claim 7, wherein the first end of the support is connected to the catcher plate along a central line of the catcher plate.

9. The spare wheel catcher assembly of claim 8, wherein the connection member of the base is a flat plate, and the support protrudes from an upper surface of the connection member.

10. The spare wheel catcher assembly of claim 9, wherein a main surface of the support is substantially perpendicular to the upper surface of the connection member and the connection member includes a plurality of holes, wherein a housing of the rear differential includes a plurality of bosses on a top and each boss has a recess, and wherein the connection member is connected to the top of the housing via a plurality of bolts passing through the plurality of holes of the connection member and the plurality of recesses of the bosses.

11. The spare wheel catcher assembly of claim 8, wherein the connection member includes a first wing and a second wing extending from a main surface of the support at opposite directions, and wherein the first wing, the second wing and the second end of the support are connected to a flange of a housing of the rear differential and the second end of the support is connected to a top of the housing of the rear differential.

12. The spare wheel catcher assembly of claim 6, wherein the main surface of the catcher plate is parallel to a plane passing through a central axis of the rear axle or is in a plane passing through a central axis of the rear axle.

13. A vehicle, comprising:
a rear differential connected with a rear axle;
a spare wheel mounted underneath a rear frame of the vehicle and disposed behind the rear differential;
a fuel tank disposed in front of the rear axle; and
a spare wheel catcher including:
a base connected to the rear differential, and
a catcher plate connected with the base, wherein a main surface of the catcher plate forms an obtuse angle with a forward moving direction of the vehicle and faces a rear of the vehicle;
wherein the main surface of the catcher plate at least partially overlaps with a front side of the spare wheel at a height direction,
wherein the front side of the spare wheel at least partially overlaps with a rear surface of the fuel tank, and
wherein the spare wheel catcher contacts the spare wheel when the spare wheel moves forward during a rear impact, and a longitudinal movement of the spare wheel is transferred into a rotation around an axis at a transverse direction of the vehicle when the catcher plate is lowered with the rear differential and rotates around a rear axle by an impact force, and
wherein the base and the catcher plate are integrally formed.

14. The vehicle of claim 13, wherein the spare wheel is disposed to have an angle to a vehicle floor.

15. The vehicle of claim 13, wherein the main surface of the catcher plate is positioned in a plane passing through a central axis of the rear axle and the plane has the obtuse angle to the forward moving direction of the vehicle.

16. The vehicle of claim 13, wherein the spare wheel catcher is disposed on atop of a housing of the rear differential, and a central line of the spare wheel catcher is adjacent and parallel to a central line of the spare wheel at a longitudinal direction.

17. The vehicle of claim 13, wherein the base includes a support extending a longitudinal direction of the vehicle and a connection member connected to a housing of the rear differential, and wherein the support has a first end and a second end closer to a front of the vehicle than the first end, and the catcher plate is connected with the first end of the support.

18. The vehicle of claim 17, wherein a main surface of the support is substantially perpendicular to an upper surface of the connection member and the connection member includes a plurality of holes, wherein a housing of the rear differential includes a plurality of bosses on a top and each boss has a recess, and wherein the connection member is connected to the top of the housing via a plurality of bolts passing through the plurality of holes of the connection member and the plurality of recesses of the bosses.

* * * * *